United States Patent [19]  
Keever

[11] 3,943,413  
[45] Mar. 9, 1976

[54] TAMPERPROOF EXTERNAL TEST CONTACT ARRANGEMENT FOR WATTHOUR METERS

[75] Inventor: Joseph M. Keever, Raleigh, N.C.

[73] Assignee: Westinghouse Electric Corporation, Pittsburgh, Pa.

[22] Filed: July 3, 1974

[21] Appl. No.: 485,676

[52] U.S. Cl. .................. 317/107; 324/74; 324/110; 339/151 B; 339/31 B
[51] Int. Cl.² .......................................... H02B 9/00
[58] Field of Search ........... 317/104, 105, 107, 108; 324/196, 110, 74, 137, 149; 339/113 R, 108 TP, 31 B, 31 T, 150 B, 151 B

[56] References Cited
UNITED STATES PATENTS

| | | | |
|---|---|---|---|
| 2,249,075 | 7/1941 | Young et al. ........................ | 317/107 |
| 2,701,859 | 2/1955 | Coleman ............................. | 324/115 |
| 3,076,167 | 1/1963 | Spencer et al. ..................... | 317/108 |

Primary Examiner—Gerald P. Tolin  
Attorney, Agent, or Firm—R. W. Smith

[57] ABSTRACT

A watthour meter of the self-contained detachable type has a protected meter testing arrangement. An isolated external test contact and an internal terminal blade connector are independently connected to a common terminal end of the meter voltage winding. The connector is manually disconnectable for testing the meter through the external test contact in an "open-link" watthour meter testing method.

3 Claims, 5 Drawing Figures

TAMPERPROOF EXTERNAL TEST CONTACT ARRANGEMENT FOR WATTHOUR METERS

BACKGROUND OF THE INVENTION

This invention relates to tamperproof induction watthour meters and more particularly to such watthour meters including an improved protected testing arrangement for preventing unathorized tampering of the meter from outside of the meter enclosure.

It is known to provide self-contained watthour meters of the detachable or socket-type so as to minimize tampering of the meter movement or associated metering circuits to alter or decrease accurate electric power billing registration of the meter. In copending application Ser. No. 485,675, filed by Finnen et al., July 3, 1974, concurrently with this application, a permanently locked watthour meter enclosure is disclosed and claimed for preventing access to the watthour meter movement by separating the meter cover from the meter base assembly. Such meters are often referred to as secure or tamperproof meters since they include additional anti-tamper design features from more conventionally provided watthour meter design features.

Even in watthour meters which are permanently locked, as disclosed in the aforementioned copending application, it is possible upon removal of the watthour meter from a meter socket to open a voltage winding disconnect link which is universally provided in commercially available watthour meters at the rear of the meter base assembly. For normal meter operation, the disconnect or potential link is positioned to externally close two auxiliary terminals to interconnect one end of the meter voltage winding and a terminal blade. If the meter is removed from the utility customer's socket and the disconnect link is moved to an open position and the meter is replaced in the meter socket, the customer's load is connected through the meter to the utility company's power lines, but the watthour meter movement will not operate since the voltage winding is deenergized.

One of the two auxiliary terminals associated with a disconnect link forms a test contact having a standardized predetermined external location on the meter base assembly. The link includes a segment of conductive material to provide a conductive path between the second auxiliary terminal and the auxiliary terminal having the test contact. The test contact terminal is connected internally directly to one terminal end of the voltage winding and the second auxiliary terminal is connected internally to one of the terminal blades. In *Electrical Metermen's Handbook*, Seventh Edition, published 1965 by Edison Electric Institute, 750 Third Avenue, New York, N.Y. 10017 in Chapters 15 and 19, watthour meter testing circuits are described including the so-called open-link method. This open-link method is one of the most common commercial methods of testing watthour meters. In the open-link method, the watthour meter metering circuit is tested by short-circuiting the meter current windings. The short circuit is accomplished by placing a wire jumper across the two bottom terminal blades and disconnecting one terminal end of the voltage winding from one of the upper terminal blades. Opening the disconnect link on the outside of the meter base assembly isolates the voltage winding from the short circuit test connection and the external test contact provides connection of the voltage winding to the test circuit. The open-link meter test circuits are included in test facilities including test tables or boards having meter test sockets. These meter test sockets usually include a spring biased test terminal positioned for contacting the test contact on the meter base assembly. Therefore, it is a standard practice for meter manufacturers to provide such test contacts at a standardized location on the meter base. The test contacts are then adapted for universal use in the standard meter test sockets of commercial watthour meter test facilities typically used by meter manufacturers and electric utility meter test departments.

In the U.S. Pat. No. 2,701,859 issued Feb. 8, 1955 to Coleman, a watthour meter is disclosed including a test circuit which includes test terminals that are wholly located within the meter enclosure. While the cover must be removed to perform testing, as in the instant invention, there are no externally exposed test contacts disclosed connected with the watthour metering circuit.

Accordingly, it is desirable to provide a secure watthour meter including a testing arrangement for performing open-link test circuit methods at an external test contact while preventing tampering of the meter externally of the meter enclosure to cause deenergization of the meter voltage winding circuit after it has been altered and the meter is replaced in service to connect a customer's load to an electric utility company's power lines.

SUMMARY OF THE INVENTION

In accordance with the present invention, a tamperproof watthour meter includes a protected testing arrangement for use in open-link test circuits while preventing access to alter the voltage winding metering circuit externally of a self-contained detachable meter enclosure. a watthour meter movement is mounted on a base assembly to form a basic meter chassis assembly. The meter chassis assembly includes terminal blades extending through the base assembly for connecting the metering circuit with mating terminals of a meter socket. A separate meter cover is attachable in locked relationship to the base assembly to permanently enclose the meter movement within a protective enclosure chamber. The meter movement includes an electromagnetic structure including a voltage winding having one coil end connected to an inner side of a single auxiliary terminal having an externally exposed test contact. The test contact has a fixed predetermined position at the rear of the base assembly. The one voltage winding terminal end is further disconnectable and connectable to one of the terminal blades by a manually releasable connector located within the protective chamber or space of the meter enclosure. The connector is mounted adjacent the one terminal blade so as to be accessible when the meter movement is permanently assembled in the meter chassis assembly.

It is a feature of this invention to provide a tamperproof watthour meter having an isolated test contact adapted for use in watthour meter testing circuit arrangements and further including an internal connector mounted adjacent one of the meter terminal blades to replace an external disconnect link arrangement. The connector is located within the protective enclosure chamber for manually disconnecting one end of the voltage winding from the terminal blade for meter testing when the meter cover is removed and for manual reconnection of the winding for placing the meter in service so that upon attachment of the meter cover to the base assembly tampering of the voltage winding metering circuit is prevented externally of the meter enclosure. A still further feature of this invention is to provide a tamperproof meter having a permanently locked enclosure which is testable prior to the cover being permanently locked to the base assembly by providing a manually releasable connector at one of the terminal blades for electrically disconnecting the voltage winding from the terminal blade during a meter test and thereafter manually reconnecting the voltage winding to the terminal blade. A further feature of this invention is to provide an improved protected voltage winding disconnect testing arrangement within a watthour meter enclosure wherein the arrangement includes a two-part manually separable connector having male and female mating parts with one of the mating parts connected at a common connection with one end of a voltage winding at an inner portion of a terminal blade wherein the connector is accessible in a meter chassis assembly for manual connection and disconnection with the other mating part, which is connected by a wire lead to one end of the voltage winding and wherein a single external test contact is also commonly connected to the winding end for external connection of the voltage winding in an open-link testing circuit when the connector disconnects the voltage winding from the terminal blade.

Other features and advantages of this invention will become apparent from the detailed description of the invention as shown in the drawings.

DESCRIPTION OF THE PREFERRED EMBODIMENTS

Figure 1:
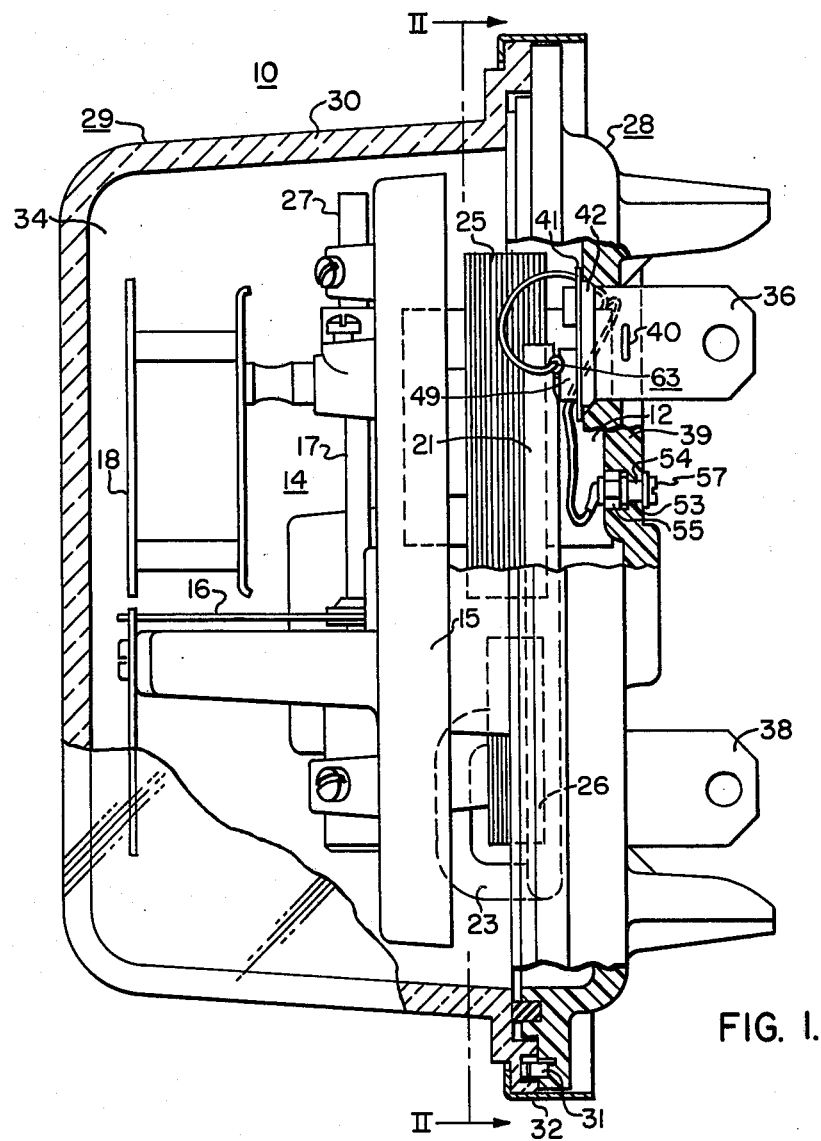
FIG. 1 is a side elevational view with parts broken away of a tamperproof watthour meter including a protected testing arrangement made in accordance with this invention.
Figure 2:
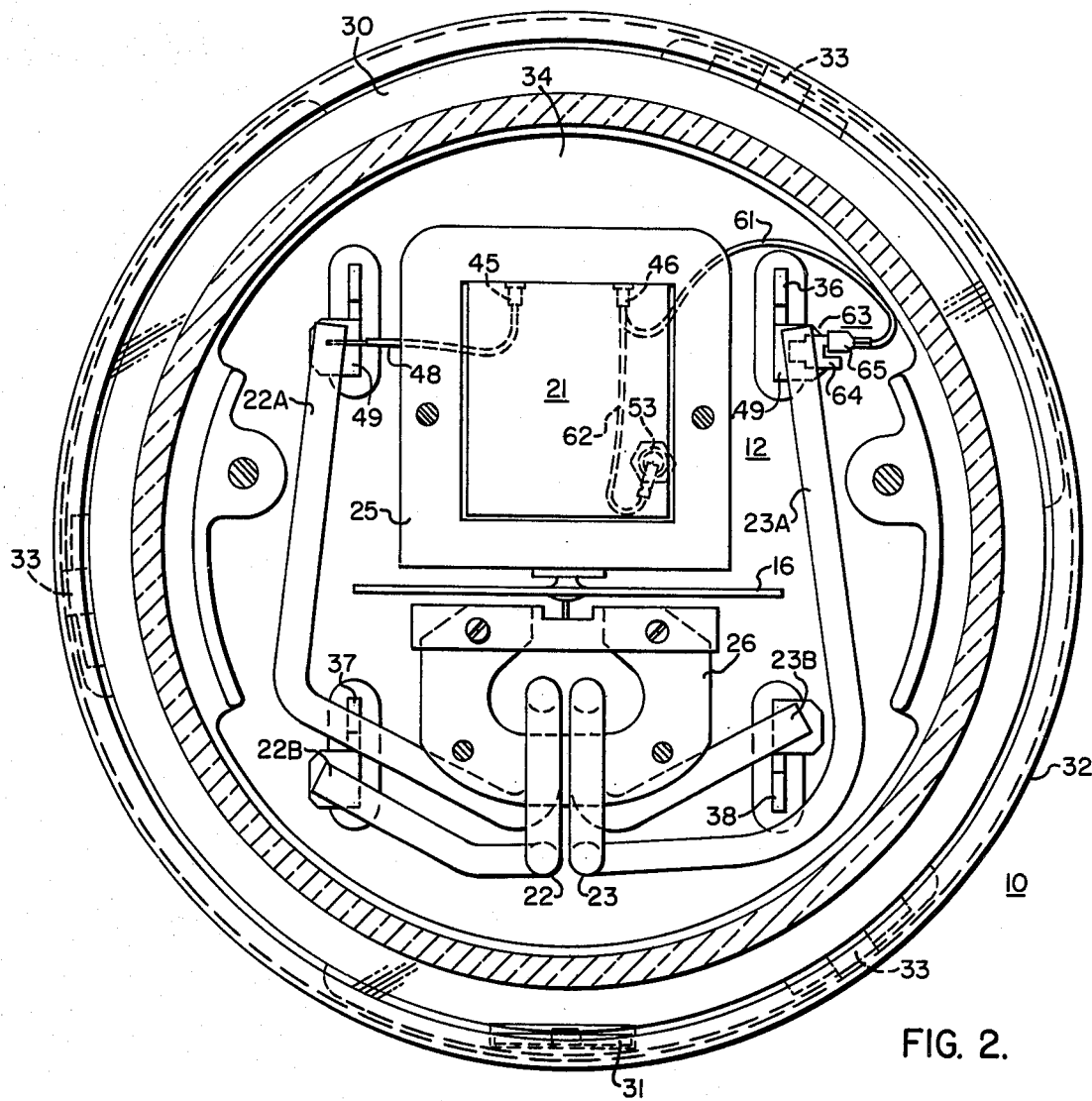
FIG. 2 is a front elevational view of FIG. 1 with parts removed.

Referring now to the drawings wherein this same numeral is used to designate the same or like parts throughout the several figures, and more particularly to FIGS. 1 and 2 wherein there is shown a tamperproof watthour meter 10 made in accordance with the present invention and including a protected meter testing arrangement 12. A meter 10 is an induction watthour integrating meter type including a meter movement 14 having a frame 15 carrying an electromagnetic structure which drives an electroconductive disk 16 having an associated shaft 17 which in turn drives the meter register 18.

The electromagnetic structure of the meter movement 14 generally includes a voltage section and a current section including a voltage winding 21 and a pair of current windings 22 and 23. The windings are made in a conventional manner which does not form a part of this invention with the voltage winding 21 wound on a stator core 25 and the currrent coils 22 and 23 wound on a current stator core 26. As is known, the voltage winding 21 and the current windings 22 and 23 are energized to inductively drive the disk 16 and, in turn, the register 18.

The watthour meter 10 described herein is a single phase, three-wire type which is further characterized as being of a self-contained, detachable or socket-type utilized for billing electric power supplied by an electric utility company to a customer's loads. The meter movement 14 is carried on a base assembly 28 by mounting the frame 15 in a permanently attached relationship, such as by rivets, not shown, to form a meter chassis assembly 27. The meter enclosure 29 is formed by the base assembly 28 and a cover 30 attached to the base assembly 28. In accordance with one intended use of this invention, it is preferable to permanently lock the cover to the base assembly by a locking clip arrangement 31 as disclosed in application Ser. No. 485,675. As described in the aforementioned application, the cover 30 is mounted to attachment lugs at the outer periphery of the base assembly 28 by means of a cover locking rim 32 having locking tabs 33 so that the cover is detachable when the clip 31 is not included. The cover 30 is preferably made of a high impact resistant material such as a polycarbonate plastic which substantially resists accidental or intentional breakage to expose the meter movement 14. The interior portions of the cover 30 and of the base assembly 28 form a protective meter chamber 34 for the meter movement 14 which is permanently locked and is inaccessible when the cover 30 and base assembly 28 are assembled together with the locking clip arrangement 31. Even when a utility company installs meter sealing wire means on the meter socket housing, these sealing wires may be broken to permit the meter to be removed from the associated meter socket at the customer's premises. When this is done, the rear of the base assembly is then accessible.

The meter chassis assembly 27 further includes four bayonet-type terminal blades 35, 36, 37 and 38 which extend rearwardly through the body 39 of the base 28 to make the metering connections to the meter movement 14. The terminal blades have a sealed relationship to the base assembly and are held in place by cotter pins 40. The terminal blades mate with jaw contacts of a meter socket, not shown, in a well-known manner. The interior side of each of the blades 35, 36, 37 and 38 includes a metal washer 41 and a sealing gasket 42 for preventing moisture and dirt particles from entering through the blade apertures of the base body 39.

As is understood by those skilled in the art, one current winding is connected in series with upper and lower ones of one pair of the terminal blades to form a series connection between the utility company power lines and the customer's loads. Accordingly, terminal ends 22A and 22B of the current winding 22 are connected in series with the pair of terminal blads 35 and 37 and terminal ends 23A and 23B of the current winding 23 are connected in series with the pair of terminal blades 36 and 38. For in service metering operation, terminal ends 45 and 46 of a wire coil forming the voltage winding 21 are connected across the blades 35 and 36, in accordance with the present invention for being connected across the customer's loads.

Referring further to FIG. 2, the voltage winding 21 has the winding terminal end 45 connected by a lead wire conductor 48 to an extending ear portion 49 of an inner portion of the terminal blade 35 by brazing or other suitable conductive fastening means. The end 22A of the current winding 22 is further brazed to the blade ear 49 as provided prior watthour meters. An auxiliary terminal 53, shown in FIG. 1, includes a stud 54 made of a conductive material extending through a hole in the base body 39 and is held in place by a nut 55 threaded to the inner end of the stud 54. A conductive screw 56 is threaded to the external end of the stud 54 and the screw head defines an external test contact 57. The external test contact has predetermined location, as described further hereinbelow, and in accordance with provision of such test contacts in commercially available watthour meters.

Figure 4:
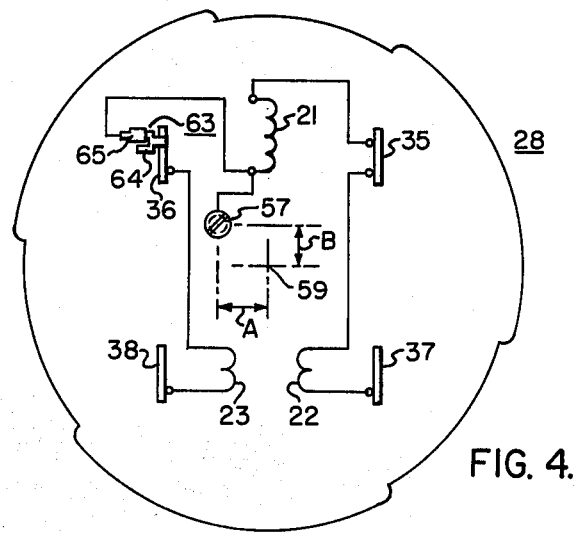
FIG. 4 is a partial rear elevational view of the base assembly of the watthour meter shown in FIG. 1 with the watthour metering circuit elements illustrated schematically.

FIG. 4 illustrates the position of the test contact 57 as vieweed from the rear of the meter base assembly 28. The location of the test contact 57 is established from the center 59 of the base assembly 28 which has a generally circular configuration. In accordance with the EEI publication No. MSJ 10-1966 and NEMA publication No. EL 20-1967 of the AEIC-EEI-NEMA Standards For Watthour Meters, the test contact 57 is at a distance A in a horizontal direction from the center 59 equal to 1.59 cm (0.625 inch) and at a vertical distance B from the center 59 equal to (0.500 inch). These distances are specified as standard so that the meter chassis assembly 27 may be plugged into universal test jacks or sockets of test metering boards or panels utilized, for example, by electric utility meter test departments. These test facilities provide methods for testing the watthour metering circuit including the voltage winding 21 and the current windings 22 and 23 and for calibration of the meters by the so-called open-link testing circuit methods described in the *Electrical Metermen's Handbook*, Seventh Edition published 1965 by the Edison Electric Institute, as noted hereinabove, in Chapters 15 and 19. As is described in the aforementioned handbook, the open-link meter test circuit method provides that the bottom terminal blades 37 and 38 are to be short-circuited together by means of a jumper wire, not shown, which is provided internally of the meter test facility. Therefore, the voltage winding 21 must be disconnected from across terminal blades 35 and 36 since the shunt provided across the terminal blades 37 and 38 would effectively short-circuit the winding 21. In the prior art watthour meters, an external voltage winding disconnect link is provided between the conductive screw 56 of one auxiliary terminal and an additional auxiliary terminal extending through base body 39 and connected to the terminal blade 36. In accordance with the present invention, an external voltage disconnect link is not provided so that it is impossible to open the voltage winding circuit from the outer and exterior side of the watthour meter enclosure and the protective chamber formed therein. The importance of this feature is because the meter 10 must be inserted into the associated meter socket to connect the utility company power lines to the customer loads through the current windings 22 and 23. If this is done with the external disconnect link of the prior art watthour meters tampered with to open the voltage winding circuit, the watthour meter will conduct electric power to the customer's loads without being operative to register the electric energy being consumed.

In accordance with the present invention, lead wire conductors 61 and 62 each have one end connected to the terminal end 46 of the voltage winding 21. The other end of lead wire 61 is connected to the terminal blade 36 by means of a manually releasable connector 63. It is an important feature of this invention that the connector 63 is accessible for manual manipulation or operation for establishing the alternate operative connecting and disconnecting states when the meter movement is mounted in a permanent relationship on the base assembly to form the meter chassis assembly 27. The other end of the lead wire 62 is permanently connected to the inner end of the stud 54, as shown in FIG. 1.

The connector 63 is illustrated as being a two-part clip type having a first part including a male part 64 and a second part including a female part 65 mating in conductive relationship to the part 64. The female part 65 is pushed onto the male part 64 or the parts are pulled apart manually since there is sliding frictional engagement therebetween that provides adequate contact for electrically connecting the terminal end 46 to the terminal blade 36. The engaging and separated conditions of the parts 64 and 65 establish the connecting and disconnecting operative states, respectively, of the connector 63. In FIG. 2 the male connector part 64 is illustrated permanently fastened directly to the ear part 49 in a fixed relationship on the interior portion of the terminal blade 36 and the end 23A of the current winding 23 is fastened to the blade 36 on top of rear portion of the connector part 64. The connector part 64 projects outwardly toward the outer peripheries of the base assembly 28 and of the meter movement 14 since the connector 63 is located between the rear of the meter frame 15 and the front and inner side of the base body 39 as shown in FIG. 2.

Figure 3:
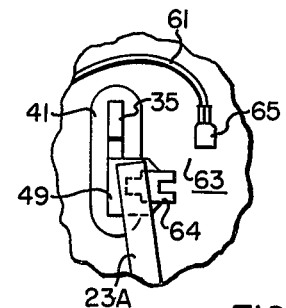
FIG. 3 is an enlarged fragmentary view of a portion of FIG. 2 illustrating a manually releasable connector in a disconnected operative condition.

In FIG. 3 there is shown a fragmentary view of the inner portion of the terminal blade 36 as shown in FIG. 2 with the connector parts 64 and 65 separated to disconnect the lead wire 61 and the voltage winding terminal end 46 from the terminal blade 36. This is required in accordance with the open-link meter test circuit method as noted hereinabove.

Figure 5:
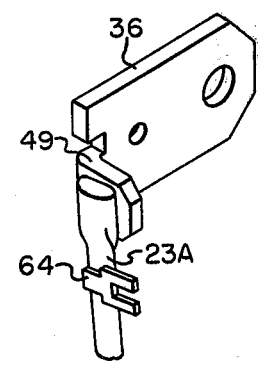
FIG. 5 illustrates an alternative mounting embodiment of a manually releasable connector illustrated in FIGS. 1 and 2.

FIG. 5 shows a separate view of the terminal blade 36 in which the male connector part 64 has a different mounted position from that shown in FIGS. 2 and 3. The end 23A of the current coil 23 is fastened directly to the ear portion 49 of the blade 36 and the male part 64, in turn, is conductively connected to the top or forward portion of the current winding end 23A as shown. Either of the connector parts 64 or 65 can be mounted in a fixed conductive relationship adjacent or in the general vicinity of the inner end of the terminal blade 36. It is apparent that other suitable positions and orientations of the connector 63 may be used in which the connector parts 64 and 65 are accessible and in a conductive relationship with the terminal blade 36.

An operation of the present invention, it is desired to test the meter movement 14 in the basic meter chassis assembly in which the meter movement 14 is permanently mounted to the base assembly 28 by the meter manufacturer. Testing is performed both at the manufacturer and at the utility company test facilities. The meters are shipped to the utility company with the cover 30 in a detachably mounted relationship. The locking clip arrangement is not used to permanently lock the cover 30 to the base assembly 28 until just prior to installation at a customer's permises. In accordance with normal practices, the watthour meters as received from the manufacturer are either sample tested or are all tested at the utility company meter test facilities. When the open-link method of testing is utilized, the connector 63 is opened by removing the female part 65 from the male part 64 by manually pulling and sliding the female part 65 from the part 64. When this is done, only test contact 57 is connected through the lead wire 62 to the voltage winding terminal end 46. The meter 10 may then be plugged into the utility company's or the meter manufacturer's test facilities to check the operation and calibration of the watthour metermovement 14.

In accordance with the open-link test method, the testing circuit is connected to the watthour meter metering circuit through the blades 35, 36, 37 and 38 and the external contact 57. Upon completion of the tests, the disconnected position of the connector 63 as shown in FIG. 3 is returned to the connected operative position as shown in FIGS. 1 and 2. Prior to installation at a customer's premises, the cover 30 is attached to the meter base assembly 28 and permanently locked in place by the locking clip arrangement 31 so as to form a permanently locked enclosure which prevents any access to the enclosure chamber without destruction of the enclosure. Since only a single isolated external heat contact 57 is exposed on the rear of the base assembly 28, there is not provided any external means to tamper or interfere with the operation of the watthour meter by opening the voltage winding circuit between the terminal blades 36 and 36. It is contemplated that there may be other modifications and changes made to the preferred embodiments of this invention as disclosed hereinabove without departing from the spirit and scope of this invention. For example, the manually disconnectable or releasable connector 63 may be replaced by other known types of such connectors. Also, the protective meter testing arrangement 12 disclosed herein for the single phase watthour meter movement 14 can be used in meter movements having two or more voltage windings.

What is claimed is:

1. A self-contained, detachable watthour meter subject to testing in a meter test socket of a test facility, said meter comprising;

a watthour meter movement including a metering circuit having a voltage winding for metering the consumption of electrical energy, said voltage winding including a pair of terminal ends;

a base assembly including inner and exterior sides, said inner side supporting said meter movement to define an integral meter chassis assembly, said base assembly including means for attaching the open end of a cup-shaped cover to said chassis assembly to form a protective chamber enclosing said meter movement;

plural terminal blades extending through said base assembly, said terminal blades having outer portions extending from said exterior side for detachably mounting said meter at a meter socket and inner portions extending from said inner side, one of said inner portions of one of said terminal blades being fixedly connected to one of said pair of terminal ends; and a protected testing arrangement including only one auxiliary terminal connected to the other of said pair of terminal ends and extending through said base assembly, said auxiliary terminal including an external test contact exposed at a fixed predetermined testing location on said exterior side of said base assembly for electrical connection to a testing circuit when said chassis assembly is mounted in the meter test socket, a manually releasable electrical connector means mounted on said chassis assembly adjacent said meter movement so as to be enclosed within the protective chamber when the cover is attached to said chassis assembly and having first and second mating parts, said first mating part being connected with another of said inner portions of another of said terminal blades, said second mating part being connected with said other of said pair of terminal ends, said electrical connector means being manually operable between connecting and disconnecting operative states, and conductor means extending adjacent said inner side of said base assembly and connecting an inner portion of said auxiliary terminal to said other of said pair of terminal ends of said voltage winding so that when said electrical connector means is in said disconnecting state, said another terminal blade is electrically disconnected from said voltage winding whereby said metering circuit is conditioned for testing through said external test contact at the meter test socket and when said electrical connector means is in said connecting state, said metering circuit is conditioned for metering the consumption of electrical energy.

2. A self-contained, detachable watthour meter as claimed in claim 1 wherein the electrical connector means includes first and second mating parts frictionally engaging in said connecting state and being slidably separable to establish said disconnecting state.

3. A self-contained, detachable watthour meter as claimed in claim 2 wherein the conductor means includes a first lead wire, first lead wirer being connected between the common terminal end of the voltage winding and the inner portion of said auxiliary terminal and wherein a second lead wire connects between the other of the pair of terminal ends of the voltage winding and the first mating part of the electrical connector means, and wherein the second mating part of the electrical connector means is fixedly connected to the another of the inner portions of the another of the terminal blades.

* * * * *